(12) United States Patent
Ogino et al.

(10) Patent No.: US 12,056,480 B2
(45) Date of Patent: Aug. 6, 2024

(54) VEHICLE PROGRAM REWRITING SYSTEM AND SHIFT DEVICE

(71) Applicant: AISIN CORPORATION, Aichi (JP)

(72) Inventors: Atsuto Ogino, Kariya (JP); Hiroshi Watarai, Kariya (JP); Yasuhiro Suzuki, Kariya (JP)

(73) Assignee: AISIN CORPORATION, Aichi (JP)

( * ) Notice: Subject to any disclaimer, the term of this patent is extended or adjusted under 35 U.S.C. 154(b) by 119 days.

(21) Appl. No.: 17/971,085

(22) Filed: Oct. 21, 2022

(65) Prior Publication Data

US 2023/0168882 A1 Jun. 1, 2023

(30) Foreign Application Priority Data

Dec. 1, 2021 (JP) .................................. 2021-195131

(51) Int. Cl.
*G06F 8/65* (2018.01)
*G07C 5/00* (2006.01)

(52) U.S. Cl.
CPC .............. *G06F 8/65* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 2019/0193653 A1* | 6/2019 | Nakamura | ............ | G06F 9/4893 |
| 2019/0235855 A1* | 8/2019 | Nakano | ................. | B60R 16/023 |
| 2019/0250902 A1* | 8/2019 | Tateishi | .................. | G06F 8/654 |
| 2019/0332371 A1* | 10/2019 | Kobayashi | ............. | G07C 5/008 |
| 2020/0183674 A1* | 6/2020 | Tateishi | ..................... | G06F 8/65 |
| 2021/0103438 A1* | 4/2021 | Itatsu | ...................... | G06F 13/00 |

FOREIGN PATENT DOCUMENTS

JP 2015-099528 A 5/2015

OTHER PUBLICATIONS

Extended European Search Report dated Apr. 5, 2023 from the European Patent Office in EP Application No. 22197956.0.

* cited by examiner

*Primary Examiner* — Qing Chen
(74) *Attorney, Agent, or Firm* — Sughrue Mion, PLLC (57) ABSTRACT

A vehicle program rewriting system includes a first control unit configured to execute a first control program for controlling a vehicle, a second control unit configured to execute a second control program for controlling the vehicle, a first communication line that connects, when rewriting at least one of the first and second control programs, the first control unit and a program update unit which transmits program update information to the first control unit, and a second communication line branching from the first communication line and connected to the second control unit. The second control unit executes control of, when the program update information for updating the second control program is transmitted, acquiring the program update information for the second control program from among communication contents between the program update unit and the first control unit acquired via the second communication line.

10 Claims, 4 Drawing Sheets

VEHICLE PROGRAM REWRITING SYSTEM AND SHIFT DEVICE

CROSS REFERENCE TO RELATED APPLICATIONS

This application is based on and claims priority under 35 U.S.C. § 119 to Japanese Patent Application 2021-195131, filed on Dec. 1, 2021, the entire content of which is incorporated herein by reference.

TECHNICAL FIELD

This disclosure relates to a vehicle program rewriting system and a shift device, and particularly, relates to a vehicle program rewriting system and a shift device including a first control unit and a second control unit.

BACKGROUND DISCUSSION

In the related art, a vehicle program rewriting system including a first control unit and a second control unit is known (for example, see JP 2015-99528A (Reference 1)).

Reference 1 discloses an electric control unit (ECU) including a main microcomputer (first control unit) and a sub microcomputer (second control unit). The ECU includes a serial communication line. The serial communication line couples the main microcomputer and the sub microcomputer.

In the ECU of Reference 1, when programs of the main microcomputer and the sub microcomputer are rewritten, the programs of the main microcomputer and the sub microcomputer are rewritten based on reception of a repro program for the main microcomputer and a repro program for the sub microcomputer transmitted from a rewriting tool.

The main microcomputer of Reference 1 is configured to receive the repro program for the main microcomputer and the repro program for the sub microcomputer, and then transmit the received repro program for the sub microcomputer via the serial communication line to the sub microcomputer. The sub microcomputer rewrites the program of the sub microcomputer based on the repro program for the sub microcomputer received from the main microcomputer.

However, in the ECU of Reference 1, when the program of the sub microcomputer is rewritten, the sub microcomputer acquires the repro program for the sub microcomputer transmitted from the rewriting tool via the main microcomputer. In this case, it is necessary for the main microcomputer to execute processing of determining which of repro programs is the repro program for the sub microcomputer, for the main microcomputer to execute processing of confirming whether the sub microcomputer can receive the repro program for the sub microcomputer, and the like. Therefore, in the ECU of Reference 1, there is a disadvantage that a processing time required for rewriting the program of the sub microcomputer increases. Therefore, in the ECU of Reference 1, a processing time for rewriting (updating) the programs of the main microcomputer and the sub microcomputer may increase.

A need thus exists for a vehicle program rewriting system and a shift device which are not susceptible to the drawback mentioned above.

SUMMARY

In order to achieve the above object, a vehicle program rewriting system according to a first aspect of this disclosure includes: a first control unit configured to execute a first control program for controlling a vehicle; a second control unit provided separately from the first control unit and configured to execute a second control program for controlling the vehicle; a first communication line that connects, when rewriting of at least one of the first control program and the second control program is executed, the first control unit and a program update unit which transmits program update information to the first control unit; and a second communication line branching from the first communication line and connected to the second control unit, in which the second control unit executes control of, when the program update information for updating the second control program is transmitted from the program update unit, acquiring the program update information for the second control program from among communication contents between the program update unit and the first control unit acquired via the second communication line.

A shift device according to a second aspect of this disclosure includes: a first control unit configured to execute a first control program for controlling a motor; a second control unit provided separately from the first control unit and configured to execute a second control program for controlling the motor together with the first control unit; a first communication line that connects, when rewriting of at least one of the first control program and the second control program is executed, the first control unit and a program update unit which transmits program update information to the first control unit; and a second communication line branching from the first communication line and connected to the second control unit, in which the second control unit executes control of, when the program update information for updating the second control program is transmitted from the program update unit, acquiring the program update information for the second control program from among communication contents between the program update unit and the first control unit acquired via the second communication line.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings.

A configuration of a shift device 100 will be described with reference to FIGS. 1 to 5.

Figure 1:
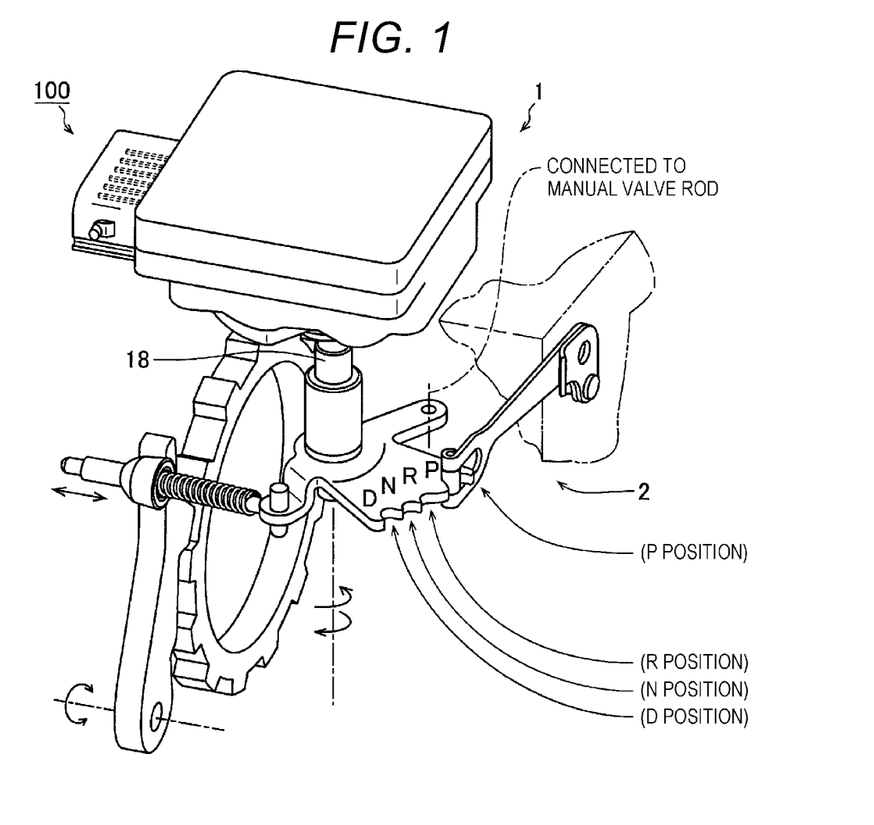
FIG. 1 is a perspective view schematically showing an overall configuration of a shift device according to the present embodiment.

The shift device 100 is mounted on a vehicle such as an automobile. As shown in FIG. 1, in the vehicle, when an occupant (a driver) executes a shift switching operation via an operation portion such as a shift lever (or a shift switch), electrical shift switching control over a transmission mechanism is executed. That is, a position of the shift lever is input at a shift device 100 side via a shift sensor provided in the operation portion. Based on control signals transmitted from a dedicated first micro controller unit (MCU) 161 (see FIG. 2) or a second MCU 171 (see FIG. 2), which will be described later, provided in the shift device 100, the transmission mechanism is switched to any one of shift positions of a parking (P) position, a reverse (R) position, a neutral (N) position, and a drive (D) position corresponding to a shift operation of the occupant. Such shift switching control is called shift-by-wire (SBW).

The shift device 100 includes an actuator unit 1 and a shift switching mechanism 2 driven by the actuator unit 1. The shift switching mechanism 2 is mechanically connected to a manual spool valve (not shown) of a hydraulic valve body in a hydraulic control circuit (not shown) and a parking mechanism in the transmission mechanism. A shift state (the P position, the R position, the N position, and the D position) of a transmission is mechanically switched by driving the shift switching mechanism 2.

Figure 2:
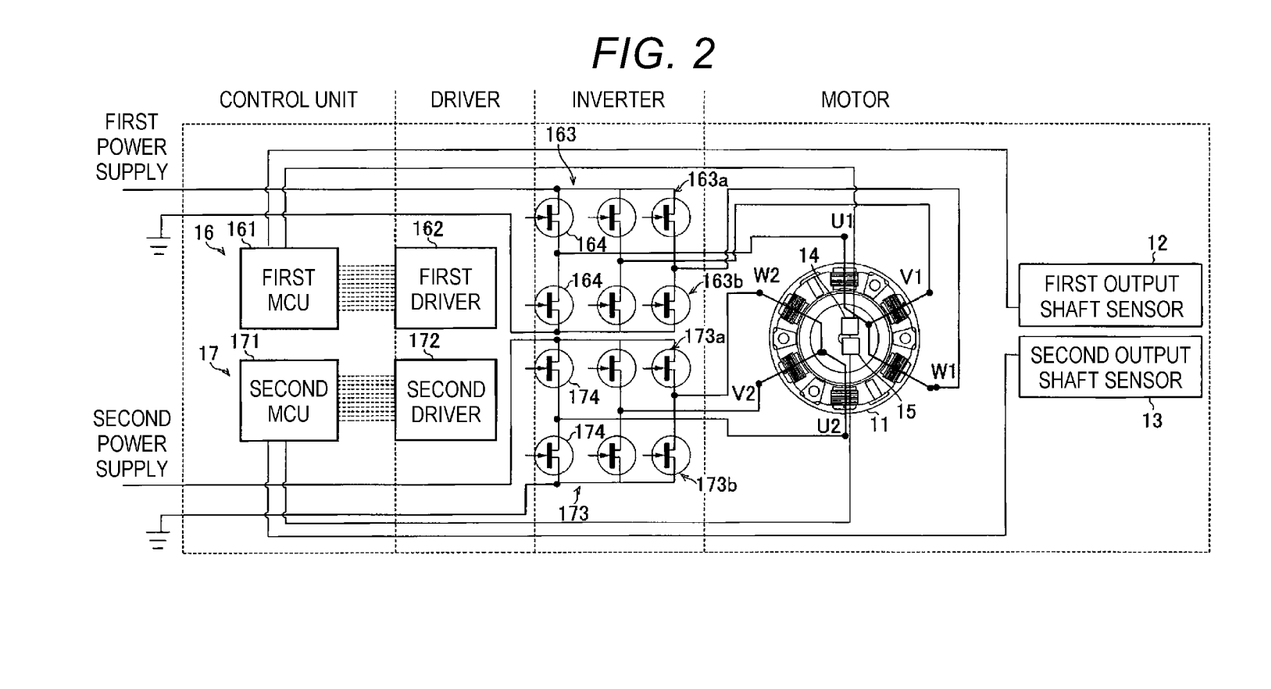
FIG. 2 is a block diagram showing a first drive system and a second drive system according to the present embodiment.

As shown in FIGS. 1 and 2, the actuator unit 1 includes a motor 11, a drive force transmission mechanism (not shown), a first output shaft sensor 12, a second output shaft sensor 13, a first motor rotation angle sensor 14, a second motor rotation angle sensor 15, a first drive system 16, and a second drive system 17.

As shown in FIG. 2, the first output shaft sensor 12 is configured to detect a rotation angle of an output shaft 18. For example, the first output shaft sensor 12 is implemented by a Hall element. A rotational position (output angle) of the output shaft 18 is detected as a continuous output shaft angle. The second output shaft sensor 13 is configured to detect a rotation angle of the output shaft 18. For example, the second output shaft sensor 13 is implemented by a Hall element. A rotational position (output angle) of the output shaft 18 is detected as a continuous output shaft angle.

The first motor rotation angle sensor 14 is configured to detect a rotation angle of a rotor (not shown) of the motor 11. For example, the first motor rotation angle sensor 14 is implemented by a magneto resistive sensor (MR sensor). The second motor rotation angle sensor 15 is configured to detect a rotation angle of the rotor (not shown) of the motor 11. For example, the second motor rotation angle sensor 15 is implemented by an MR sensor.

The shift device 100 includes a redundant drive system including the first drive system 16 and the second drive system 17.

The first drive system 16 executes control of, based on measurement values of the first output shaft sensor 12 and the first motor rotation angle sensor 14, driving the motor 11. Specifically, the first drive system 16 includes the first MCU 161 (an example of a "first control unit" in claims), a storage unit (not shown), a first driver 162, and a first inverter 163.

The first MCU 161 is configured to control a voltage for driving the motor 11. The first MCU 161 is a substrate component in which electronic components are mounted on a substrate. The storage unit is a storage device including memories such as a read only memory (ROM) and a random access memory (RAM). The storage unit stores a first control program for controlling the motor 11. The first driver 162 is configured to transmit a signal for controlling the first inverter 163. The first driver 162 is an electronic component. The first inverter 163 includes a plurality of (six) drive field effect transistors (FETs) 164 which can be switched ON or OFF in response to the signal from the first driver 162. In the first inverter 163, by switching ON or OFF of the plurality of drive FETs 164, sine-wave three-phase AC voltages (a U phase, a V phase, and a W phase) are output. The first inverter 163 includes an upper arm 163a including a plurality of (three) drive FETs 164 and a lower arm 163b including a plurality of (three) drive FETs 164.

The second drive system 17 executes control of, based on measurement values of the second output shaft sensor 13 and the second motor rotation angle sensor 15, driving the motor 11. Specifically, the second drive system 17 includes the second MCU 171 (an example of a "second control unit" in claims), a storage unit (not shown), a second driver 172, and a second inverter 173.

The second MCU 171 is configured to control a voltage for driving the motor 11. The second MCU 171 is a substrate component in which electronic components are mounted on a substrate. The storage unit is a storage device including memories such as a ROM and a RAM. The storage unit stores a second control program for controlling the motor 11. The second driver 172 is configured to transmit a signal for controlling the second inverter 173. The second driver 172 is an electronic component. The second inverter 173 includes a plurality of (six) drive FETs 174 which can be switched ON or OFF in response to a signal from the second driver 172. In the second inverter 173, by switching ON or OFF of the plurality of drive FETs 174, sine-wave three-phase AC voltages (a U phase, a V phase, and a W phase) are output. The second inverter 173 includes an upper arm 173a including a plurality of (three) drive FETs 174 and a lower arm 173b including a plurality of (three) drive FETs 174.

Vehicle Program Rewriting System

Figure 3:
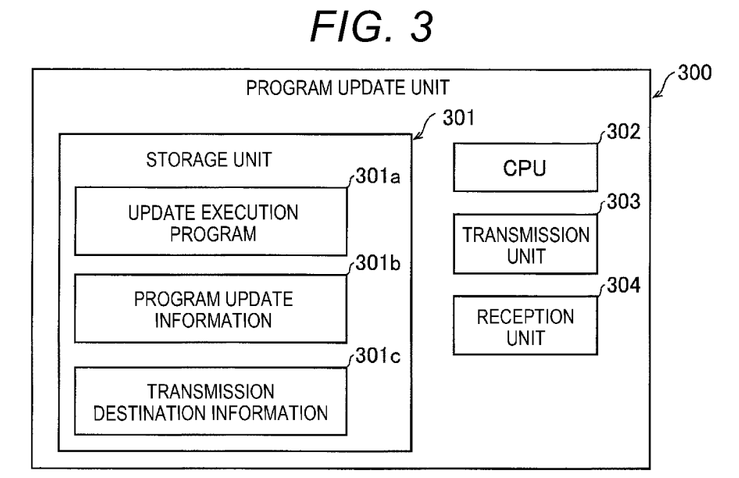
FIG. 3 is a block diagram showing a program update unit connected to the shift device according to the present embodiment.
Figure 4:
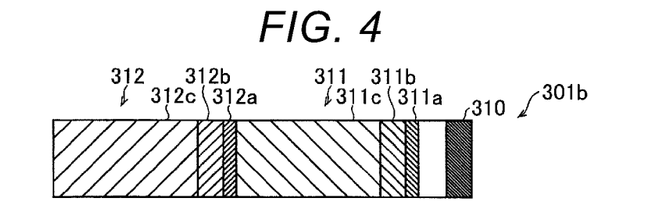
FIG. 4 is a schematic diagram showing program update information transmitted from the program update unit connected to the shift device according to the present embodiment.
Figure 5:
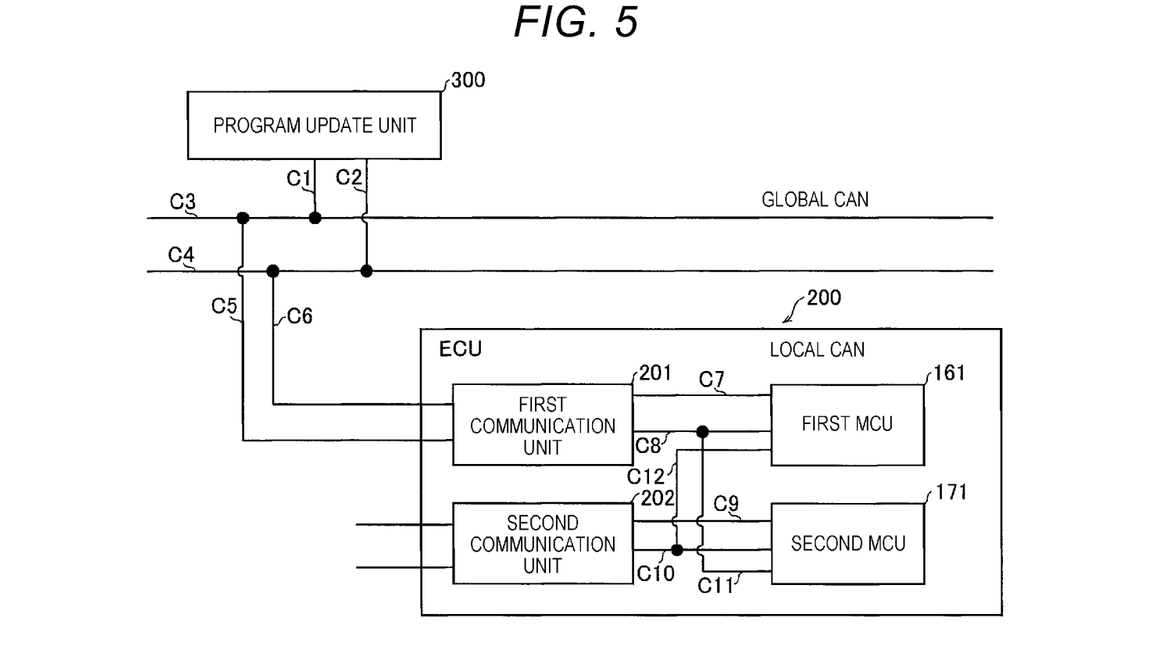
FIG. 5 is a block diagram showing a vehicle program rewriting system according to the present embodiment.

As shown in FIGS. 3 to 5, the shift device 100 includes a vehicle program rewriting system 200 that updates each of the first control program of the first MCU 161 and the second control program of the second MCU 171. Here, update of each of the first control program of the first MCU 161 and the second control program of the second MCU 171 is executed when the vehicle is inspected at a dealer, a factory, or the like. In a vehicle inspection in a dealer, a factory, or the like, the first control program of the first MCU 161 and the second control program of the second MCU 171 are updated when a program update unit 300 and the vehicle program rewriting system 200 are connected by an operator.

As shown in FIG. 3, the program update unit 300 is a device (repro tool) that updates each of the first control program of the first MCU 161 and the second control program of the second MCU 171. The program update unit 300 includes a storage unit 301, a central processing unit (CPU) 302, a transmission unit 303, and a reception unit 304.

The storage unit 301 is a storage device including memories such as a ROM and a RAM. The storage unit 301 stores an update execution program 301a, program update information 301b, and transmission destination information 301c. The CPU 302 is configured to process the update execution program 301a. The transmission unit 303 is configured to transmit information (data) from the program update unit 300. The reception unit 304 is configured to receive information (data) from another device.

As shown in FIG. 4, the program update information 301b includes update unit identification information 310, first control program update information 311, and second control program update information 312 (an example of "program update information for the second control program" in claims). The update unit identification information 310 is a frame ID for identifying the program update unit 300. The first control program update information 311 is data for updating the first control program. The second control program update information 312 is data for updating the second control program.

The first control program update information 311 includes a date and time 311a, first identification information 311b, and first update data 311c. The date and time 311a is a date and time when a program is updated by the program update unit 300. The first identification information 311b is information for identifying the first update data 311c, which is information for updating the first MCU 161 itself, from the program update information 301b. The first identification information 311b is a virtual address assigned to the first MCU 161. The first update data 311c is data for updating parameters of the first control program.

The second control program update information 312 includes a date and time 312a, second identification information 312b, and second update data 312c. The date and time 312a is a date and time when a program is updated by the program update unit 300. The second identification information 312b is information for identifying the second update data 312c, which is information for updating the second MCU 171 itself, from the program update information 301b. The second identification information 312b is a virtual address assigned to the second MCU 171. The second update data 312c is data for updating parameters of the second control program.

The transmission destination information 301c is information for transmitting the program update information 301b to the first MCU 161. The transmission destination information 301c is information based on an ID assigned to the first MCU 161.

As shown in FIG. 5, the program update unit 300 transmits the program update information 301b to the first MCU 161 when the first control program and the second control program are rewritten. That is, the program update unit 300 transmits both the first control program update information 311 and the second control program update information 312 to the first MCU 161 based on the transmission destination information 301c for the first MCU 161. Thus, the program update unit 300 also transmits the second control program update information 312 when transmitting the first control program update information 311.

Here, the vehicle program rewriting system 200 includes the motor 11 (see FIG. 2), the first MCU 161, the second MCU 171, a plurality of communication lines C1 to C12, a first communication unit 201, and a second communication unit 202. Here, the first MCU 161, the second MCU 171, a plurality of communication lines C7 to C12, the first communication unit 201, and the second communication unit 202 constitute an electric control unit (ECU). Since the first MCU 161 and the second MCU 171 are described above, description thereof will be omitted.

The communication lines C1 to C6 are communication lines for constituting a global controller area network (CAN). Each of the communication lines C1 to C6 is a serial communication line. The communication line C1 couples the transmission unit 303 of the program update unit 300 and the communication line C3. The communication line C2 couples the reception unit 304 of the program update unit 300 and the communication line C4. The communication line C3 couples the transmission unit 303 and another device. The communication line C4 couples another device and the reception unit 304. The communication line C5 branches from the communication line C3 and is connected to a reception unit of the first communication unit 201. The communication line C6 branches from the communication line C4 and is connected to a transmission unit of the first communication unit 201. Here, a combination of the communication line C1, the communication line C3, the communication line C5, and the communication line C8 is an example of a "first communication line" in claims.

Thus, the transmission unit 303 of the program update unit 300 and a reception unit of the first MCU 161 are connected to each other via the communication line C1, the communication line C3, the communication line C5, and the communication line C8. The reception unit 304 of the program update unit 300 and a transmission unit of the first MCU 161 are connected to each other via the communication line C2, the communication line C4, the communication line C6, and the communication line C7. The program update unit 300 and the first MCU 161 communicate with each other via the CAN via the first communication unit 201.

The communication lines C7 to C12 are communication lines for constituting a CAN. Each of the communication lines C7 to C12 is a serial communication line. The communication line C7 couples the reception unit of the first communication unit 201 and the transmission unit of the first MCU 161. The communication line C8 couples the transmission unit of the first communication unit 201 and the reception unit of the first MCU 161. The communication line C9 couples a reception unit of the second communication unit 202 and a transmission unit of the second MCU 171. The communication line C10 (an example of a "third communication line" in claims) couples a transmission unit of the second communication unit 202 and a reception unit of the second MCU 171. The communication line C11 (an example of a "second communication line" in claims) branches from the communication line C8 and is connected to the reception unit of the second MCU 171. That is, the communication line C11 branches from a portion of the communication line C1, the communication line C3, the communication line C5, and the communication line C8 between the first communication unit 201 and the first MCU 161. The communication line C12 (an example of a "fourth communication line" in claims) branches from the communication line C10 and is connected to the reception unit of the first MCU 161.

Thus, the first communication unit 201 and the first MCU 161 communicate with each other via the communication line C7. The first communication unit 201 and the second MCU 171 communicate with each other via the communication line C11. The second communication unit 202 and the second MCU 171 communicate with each other via the communication line C9. The second communication unit 202 and the first MCU 161 communicate with each other via the communication line C12.

The first communication unit 201 is configured to establish communication between the program update unit 300 and the first MCU 161. The first communication unit 201 is a CAN IC. The first communication unit 201 is configured to convert a signal from the program update unit 300 into a signal which can be identified by the first MCU 161. That is, the first communication unit 201 converts CAN High and CAN Low signals transmitted from the program update unit 300 into recessive (1) and dominant (0) signals, respectively. Conversely, the first communication unit 201 converts the recessive (1) and dominant (0) signals transmitted from the first MCU 161 into the CAN High and CAN Low signals, respectively.

The second communication unit 202 is configured to communicate with the second MCU 171. The second communication unit 202 is configured to establish communication between another device and the second MCU 171. The second communication unit 202 is a CAN IC. The second communication unit 202 is configured to convert a signal from the other device into a signal which can be identified by the second MCU 171. That is, the second communication unit 202 converts CAN High and CAN Low signals transmitted from the other device into recessive (1) and dominant (0) signals, respectively. Conversely, the second communication unit 202 converts the recessive (1) and dominant (0) signals transmitted from the second MCU 171 into the CAN High and CAN Low signals, respectively.

Control Configuration of Program Update

As shown in FIGS. 4 and 5, in the vehicle program rewriting system 200 according to the present embodiment, the second MCU 171 can acquire the second control program update information 312 without using the first MCU 161. Here, when the second MCU 171 acquires the second control program update information 312 via the first MCU 161, it is necessary for the first MCU 161 to execute processing of determining which piece of the program update information 301b is the second control program update information 312, for the first MCU 161 to execute processing of determining whether the second MCU 171 can receive the second control program update information 312, and the like. Therefore, a processing time required for the program update increases.

Therefore, the second MCU 171 executes control of, when the second control program update information 312 (program update information) for updating the second control program is transmitted from the program update unit 300, acquiring the second control program update information 312 (program update information) for the second control program from among communication contents between the program update unit 300 and the first MCU 161 acquired via the communication line C11.

Specifically, the second MCU 171 is configured to execute control of acquiring the communication contents between the program update unit 300 and the first MCU 161 always via the communication line C11. The second MCU 171 executes control of, based on acquisition of the update unit identification information 310 from among the communication contents, recognizing that the program update unit 300 is connected. The second MCU 171 executes control of, based on the acquisition of the second identification information 312b, acquiring the date and time 312a and the second update data 312c related to the second identification information 312b from among the program update information 301b. The second MCU 171 executes control of, based on the second update data 312c, updating the second control program.

The second MCU 171 is configured to execute control of transmitting an update completion notification to the program update unit 300 after updating the second control program. Here, in the vehicle program rewriting system 200, the update completion notification is transmitted from the second MCU 171 to the program update unit 300 using an echo back function of the second communication unit 202.

Specifically, the second MCU 171 is configured to execute control of transmitting the update completion notification via the communication line C9 to the second communication unit 202 after updating the second control program. The second communication unit 202 executes control of, based on acquisition of the update completion notification of the second control program from the second MCU 171 based on the second control program update information 312 (program update information), returning the update completion notification via the communication line C10 to the second MCU 171 and transmitting the update completion notification via the communication line C12 to the first MCU 161.

The first MCU 161 is configured to execute control of transmitting, to the program update unit 300, the update completion notification of the second MCU 171 acquired via the communication line C12 as it is. Specifically, the first MCU 161 is configured to execute control of transmitting the update completion notification of the second MCU 171 via the communication line C7 to the first communication unit 201. The first communication unit 201 transmits, based on acquisition of the update completion notification of the second MCU 171 from the first MCU 161, the update completion notification of the second MCU 171 via the communication line C2, the communication line C4, and the communication line C6 to the program update unit 300.

Thus, the program update unit 300 recognizes completion of the update of the second control program of the second MCU 171.

The first MCU 161 executes control of, when the first control program update information 311 (program update information) for updating the first control program is transmitted from the program update unit 300, updating the first control program based on acquisition of the first control program update information 311.

Specifically, the first MCU 161 executes control of recognizing that the program update unit 300 is connected, based on the acquisition of the update unit identification information 310 from the program update unit 300. The first MCU 161 executes control of, based on the acquisition of the first identification information 311b, acquiring the date and time 311a and the first update data 311c related to the first identification information 311b from among the program update information 301b. The first MCU 161 is configured to execute control of updating the first control program based on the first update data 311c.

The first MCU 161 is configured to execute control of transmitting an update completion notification to the program update unit 300 after updating the first control program.

Specifically, the first MCU 161 is configured to execute control of transmitting the update completion notification via the communication line C7 to the first communication unit 201 after updating the first control program. The first communication unit 201 transmits, based on acquisition of the update completion notification of the first MCU 161 from the first MCU 161, the update completion notification of the first MCU 161 via the communication line C1, the communication line C2, the communication line C3, the communication line C4, the communication line C5, and the communication line C6 to the program update unit 300.

Thus, the program update unit 300 recognizes completion of the update of the first control program of the first MCU 161.

Thus, in the vehicle program rewriting system 200, the update of the first control program of the first MCU 161 and the update of the second control program of the second MCU 171 can be continuously executed.

Program Rewriting Processing

Figure 6:
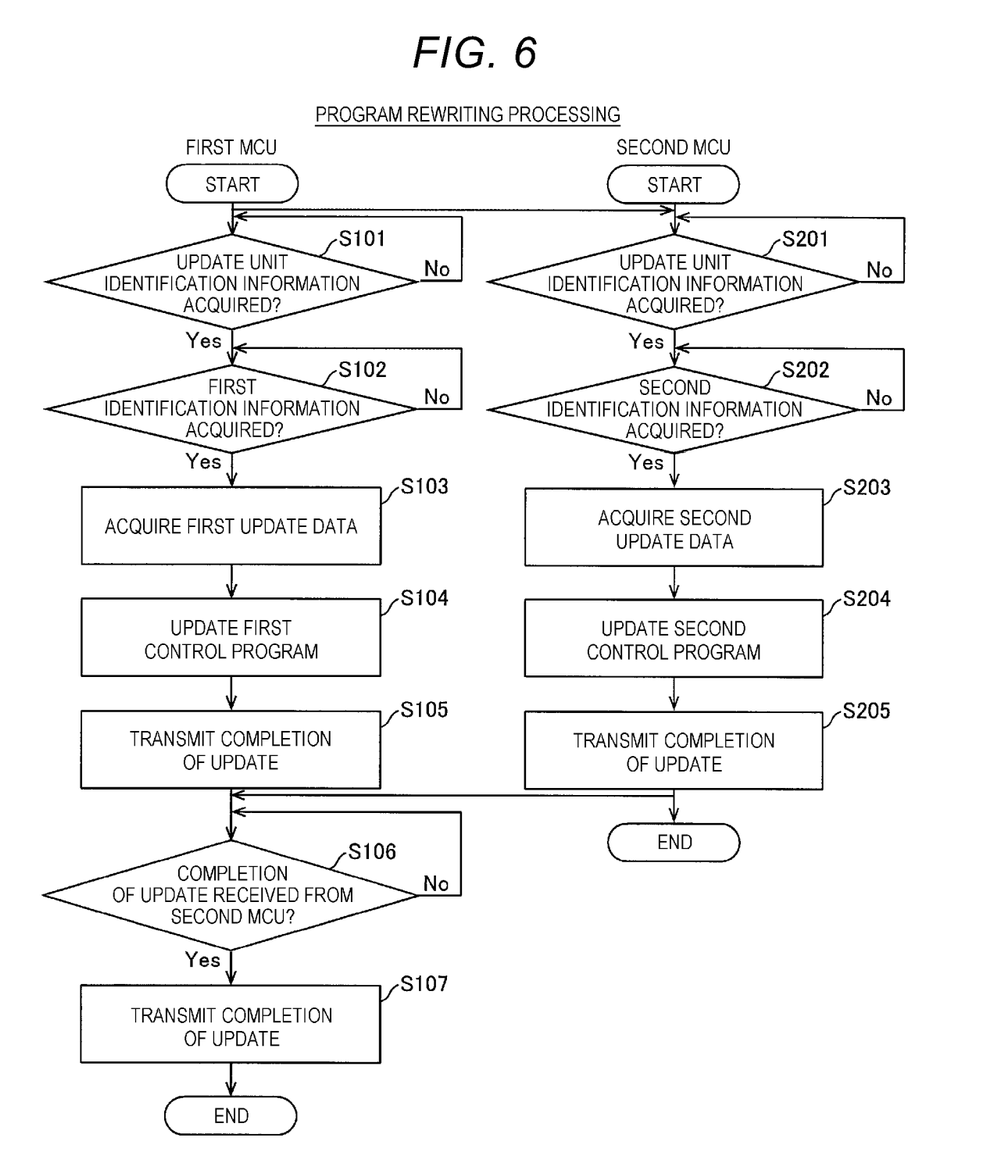
FIG. 6 is a flowchart showing program rewriting processing executed in a first MCU and a second MCU of the vehicle program rewriting system according to the present embodiment.

In the following, with reference to FIG. 6, the program rewriting processing indicating the update of the first control program of the first MCU 161 and the update of the second control program of the second MCU 171 will be described.

First, program rewriting processing on a first MCU 161 side will be described.

In step S101, the first MCU 161 determines whether the update unit identification information 310 is acquired from the program update unit 300. When the update unit identification information 310 is acquired, the processing proceeds to step S102, and when the update unit identification information 310 is not acquired, step S101 is repeated. In step S102, the first MCU 161 determines whether the first identification information 311b is acquired. When the first identification information 311b is acquired, the processing proceeds to step S103, and when the first identification information 311b is not acquired, step S102 is repeated.

In step S103, the first MCU 161 executes control of, based on the acquisition of the first identification information 311b, acquiring the first update data 311c related to the first identification information 311b from among the program update information 301b. In step S104, the first MCU 161 updates the first control program based on the first update data 311c. In step S105, the first MCU 161 transmits completion of the update via the first communication unit 201 to the program update unit 300.

In step S106, the first MCU 161 determines whether the completion of the update is received from the second MCU 171 via the second communication unit 202. When the completion of the update is received, the processing proceeds to step S107, and when the completion of the update is not received, step S106 is repeated. In step S107, the first MCU 161 transmits an update completion notification of the second MCU 171 as it is, via the first communication unit 201, to the program update unit 300. Accordingly, the program rewriting processing on the first MCU 161 side ends.

Next, program rewriting processing on a second MCU 171 side will be described.

In step S201, the second MCU 171 intercepts communication contents between the program update unit 300 and the first MCU 161 to determine whether the update unit identification information 310 is acquired from the program update unit 300. When the update unit identification information 310 is acquired, the processing proceeds to step S202, and when the update unit identification information 310 is not acquired, step S201 is repeated. In step S202, the second MCU 171 determines whether the second identification information 312b is acquired. When the second identification information 312b is acquired, the processing proceeds to step S203, and when the second identification information 312b is not acquired, step S202 is repeated.

In step S203, the second MCU 171 executes control of, based on the acquisition of the second identification information 312b, acquiring the second update data 312c related to the second identification information 312b from among the program update information 301b. In step S204, the second MCU 171 updates the second control program based on the second update data 312c. In step S205, the second MCU 171 transmits completion of the update to the second communication unit 202. Accordingly, the program rewriting processing on the second MCU 171 side ends.

Effects of Present Embodiment

In the present embodiment, the following effects can be attained.

In the present embodiment, as described above, the second MCU 171 executes control of, when the program update information 301b for updating the second control program is transmitted from the program update unit 300, acquiring the second control program update information 312 (program update information for the second control program) from among communication contents between the program update unit 300 and the first MCU 161 acquired via the communication line C11 and the communication line C2. Accordingly, since the second MCU 171 can acquire the second control program update information 312 without going through the first MCU 161, an amount of processing required for updating the second control program of the second MCU 171 can be reduced by an amount not going through the first MCU 161. As a result, a processing time for updating the programs of the first MCU 161 and the second MCU 171 can be shortened.

In the present embodiment, as described above, the vehicle program rewriting system 200 includes the first communication unit 201 which establishes communication between the program update unit 300 and the first MCU 161. The communication line C11 branches from the portion of the communication line C1, the communication line C2, the communication line C3, the communication line C4, the communication line C5, the communication line C6, and the communication line C8 between the first communication unit 201 and the first MCU 161. Accordingly, since the communication between the program update unit 300 and the first MCU 161 is established, a signal transmitted from the program update unit 300 can be converted into a signal which can be identified in the first MCU 161 in the first communication unit 201. Therefore, the program update information 301b transmitted from the program update unit 300 and acquired via the communication line C11 can also be identified in the second MCU 171.

In the present embodiment, as described above, the vehicle program rewriting system 200 includes the second communication unit 202 which communicates with the second MCU 171, the communication line 010 which couples the second communication unit 202 and the second MCU 171, and the communication line C12 branching from the communication line C10 and connected to the first MCU 161. The second communication unit 202 executes control of, based on acquisition of the update completion notification of the second control program from the second MCU 171 based on the program update information 301b, returning the update completion notification to the second MCU 171 and transmitting the update completion notification via the communication line C12 to the first MCU 161. Accordingly, it is possible to transmit the update completion notification of the second MCU 171 transmitted via the communication line C12 to the first MCU 161 via the first MCU 161 to the program update unit 300 while causing the second MCU 171 to confirm via the communication line 010 that the second communication unit 202 receives the update completion notification, and thus it is possible to efficiently execute processing of the second communication unit 202.

In the present embodiment, as described above, the first MCU 161 is configured to execute control of transmitting the update completion notification of the second MCU 171 as it is, acquired via the communication line C12, to the program update unit 300. Accordingly, the first MCU 161 only needs to transmit the update completion notification of the second MCU 171 as it is to the program update unit 300, and thus an increase in an amount of processing in the first MCU 161 can be prevented.

In the present embodiment, as described above, the vehicle program rewriting system 200 includes the motor 11 controlled by the first MCU 161 and the second MCU 171.

The first MCU 161 executes control of, based on the acquisition of the program update information 301b for updating the first control program for controlling the motor 11 from the program update unit 300, updating the first control program. The second MCU 171 executes control of, based on the acquisition of the program update information 301b for updating the second control program for controlling the motor 11 from the program update unit 300 via the communication line C11, updating the second control program. Accordingly, since the second MCU 171 can acquire the second control program update information 312 (program update information for the second control program) for controlling the motor 11 without going through the first MCU 161, an amount of processing required for updating the second control program of the second MCU 171 can be reduced by an amount not going through the first MCU 161. As a result, a processing time for updating the programs of the first MCU 161 and the second MCU 171 for controlling the motor 11 can be shortened.

In the present embodiment, as described above, in the shift device 100, the second MCU 171 executes control of, when the program update information 301b for updating the second control program is transmitted from the program update unit 300, acquiring the second control program update information 312 (program update information for the second control program) from among communication contents between the program update unit 300 and the first MCU 161 acquired via the communication line C11. Accordingly, since the second MCU 171 can acquire the second control program update information 312 without going through the first MCU 161, an amount of processing required for updating the second control program of the second MCU 171 can be reduced by an amount not going through the first MCU 161. As a result, it is possible to obtain the shift device 100 capable of shortening a processing time for updating the programs of the first MCU 161 and the second MCU 171.

Modification

It should be considered that the above embodiment disclosed here is an example in all respects and is not restrictive. The scope disclosed here is shown according to the claims rather than the description of the above embodiment, and further includes all changes (modifications) within the meaning and the scope equivalent to the claims.

For example, in the above embodiment, the shift device 100 executes rewriting of both the first control program and the second control program, but this disclosure is not limited to this example. This disclosure may be configured to execute rewriting of either the first control program or the second control program.

In the above embodiment, each of the first control program and the second control program is a program for controlling the motor 11, but this disclosure is not limited to this example. In this disclosure, each of the first control program and the second control program may be a program for executing programming required for controlling a vehicle (for example, failure diagnosis of a device mounted on the vehicle).

In the above embodiment, an example in which the update completion notification is transmitted from the second MCU 171 (second control unit) via the second communication unit 202 and the first MCU 161 (first control unit) to the program update unit 300 using the echo back function of the second communication unit 202 is described, but this disclosure is not limited to this example. In this disclosure, a communication line that connects the first control unit and the second control unit may be provided, and the update completion notification may be transmitted from the second control unit via the first control unit to the program update unit.

In the above embodiment, an example is shown in which the shift device 100 disclosed here is applied to a shift device for an automobile, but this disclosure is not limited to this example. In this disclosure, the shift device may be applied to a shift device other than the shift device for an automobile, such as a shift device for a train.

In the above embodiment, for convenience of description, an example is shown in which control processing of the first MCU 161 (the first control unit) and the second MCU 171 (the second control unit) is described using a flow-driven flowchart for sequentially executing processing according to a processing flow, but this disclosure is not limited to this example. In this disclosure, the control processing of the first control unit and the second control unit may be executed by an event-driven processing for executing processing in event units. In this case, the processing may be executed in a completely event-driven manner, or may be executed by combining the event-driven processing and the flow-driven processing.

A vehicle program rewriting system according to a first aspect of this disclosure includes: a first control unit configured to execute a first control program for controlling a vehicle; a second control unit provided separately from the first control unit and configured to execute a second control program for controlling the vehicle; a first communication line that connects, when rewriting of at least one of the first control program and the second control program is executed, the first control unit and a program update unit which transmits program update information to the first control unit; and a second communication line branching from the first communication line and connected to the second control unit, in which the second control unit executes control of, when the program update information for updating the second control program is transmitted from the program update unit, acquiring the program update information for the second control program from among communication contents between the program update unit and the first control unit acquired via the second communication line.

In the vehicle program rewriting system according to the first aspect of this disclosure, as described above, the second control unit executes control of, when the program update information for updating the second control program is transmitted from the program update unit, acquiring the program update information for the second control program from among the communication contents between the program update unit and the first control unit acquired via the second communication line. Accordingly, since the second control unit can acquire the program update information for the second control program without going through the first control unit, an amount of processing required for updating the second control program of the second control unit can be reduced by an amount not going through the first control unit. As a result, a processing time for updating programs of the first control unit and the second control unit can be shortened.

In the vehicle program rewriting system according to the first aspect of this disclosure, the first control unit preferably executes control of updating the first control program based on acquisition of the program update information for updating the first control program for controlling a motor from the program update unit.

In the above vehicle program rewriting system according to the first aspect preferably further includes: a first communication unit configured to establish communication between the program update unit and the first control unit, in which the second communication line branches from a portion of the first communication line between the first communication unit and the first control unit.

According to this configuration, since the communication between the program update unit and the first control unit is established, a signal transmitted from the program update unit can be converted into a signal which can be identified in the first control unit in the first communication unit. Therefore, the program update information transmitted from the program update unit and acquired via the second communication line can also be identified in the second control unit.

The vehicle program rewriting system according to the first aspect preferably further includes: a second communication unit configured to communicate with the second control unit; a third communication line that connects the second communication unit and the second control unit; and a fourth communication line branching from the third communication line and connected to the first control unit, in which the second communication unit executes control of, based on acquisition of an update completion notification of the second control program from the second control unit based on the program update information, returning the update completion notification to the second control unit and transmitting the update completion notification via the fourth communication line to the first control unit.

According to this configuration, it is possible to transmit the update completion notification of the second control unit transmitted via the fourth communication line to the first control unit via the first control unit to the program update unit while causing the second control unit to confirm via the third communication line that the second communication unit receives the update completion notification, and thus it is possible to efficiently execute processing of the second communication unit.

In this case, the first control unit is preferably configured to execute control of transmitting, to the program update unit, the update completion notification of the second control unit acquired via the fourth communication line as it is.

According to this configuration, the first control unit only needs to transmit the update completion notification of the second control unit as it is to the program update unit, and thus an increase in an amount of processing in the first control unit can be prevented.

The vehicle program rewriting system according to the first aspect preferably further includes: a motor controlled by the first control unit and the second control unit, in which the first control unit executes control of, based on acquisition of the program update information for updating the first control program for controlling the motor from the program update unit, updating the first control program, and the second control unit executes control of, based on acquisition of the program update information for updating the second control program from the program update unit via the second communication line, updating the second control program.

According to this configuration, since the second control unit can acquire the program update information for the second control program without going through the first control unit, an amount of processing required for updating the second control program of the second control unit can be reduced by an amount not going through the first control unit. As a result, a processing time for updating programs of the first control unit and the second control unit can be shortened.

A shift device according to a second aspect of this disclosure includes: a first control unit configured to execute a first control program for controlling a motor; a second control unit provided separately from the first control unit and configured to execute a second control program for controlling the motor together with the first control unit; a first communication line that connects, when rewriting of at least one of the first control program and the second control program is executed, the first control unit and a program update unit which transmits program update information to the first control unit; and a second communication line branching from the first communication line and connected to the second control unit, in which the second control unit executes control of, when the program update information for updating the second control program is transmitted from the program update unit, acquiring the program update information for the second control program from among communication contents between the program update unit and the first control unit acquired via the second communication line.

In the shift device according to the second aspect of this disclosure, as described above, the second control unit executes control of, when the program update information for updating the second control program is transmitted from the program update unit, acquiring the program update information for the second control program from among the communication contents between the program update unit and the first control unit acquired via the second communication line. Accordingly, since the second control unit can acquire the program update information for the second control program without going through the first control unit, an amount of processing required for updating the second control program of the second control unit can be reduced by an amount not going through the first control unit. As a result, it is possible to obtain a shift device capable of shortening a processing time for updating the programs of the first control unit and the second control unit.

In the vehicle program rewriting system according to the first aspect, the following configuration is also conceivable.

APPENDIX 1

That is, the program update information includes first control program update information for updating the first control program and second control program update information for updating the second control program, and the program update unit transmits the second control program update information when transmitting the first control program update information.

According to this configuration, since the first control program and the second control program can be updated at the same time, it is possible to prevent a problem caused by updating only one of the first control program and the second control program.

APPENDIX 2

In the vehicle program rewriting system, preferably, a vehicle conversion device includes the first control program update information and the second control program update information, the program update unit includes transmission destination information of the first control unit for transmitting the program update information to the first control unit, and the program update unit transmits both the first control program update information and the second control program update information to the first control unit based on the transmission destination information of the first control unit.

According to this configuration, since the program update unit only needs to transmit both the first control program update information and the second control program update information to the first control unit, it is not necessary to newly provide a communication line or the like for connecting the program update unit and the second control unit. As a result, it is possible to prevent an increase in the number of components in the vehicle program rewriting system.

APPENDIX 3

In the vehicle program rewriting system, preferably, both the first control program update information and the second control program update information are transmitted to the first control unit, and the program update information includes first identification information for identifying the program update information of the first control unit and second identification information for identifying the program update information of the second control unit.

According to this configuration, each of the first control unit and the second control unit can reliably identify its own program update information.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle program rewriting system comprising:
   a first control unit configured to execute a first control program for controlling a vehicle;
   a second control unit provided separately from the first control unit and configured to execute a second control program for controlling the vehicle;
   a first communication line that connects, when rewriting of at least one of the first control program and the second control program is executed, the first control unit and a program update unit which transmits program update information to the first control unit; and
   a second communication line branching from the first communication line and connected to the second control unit, wherein
   the second control unit executes control of, when the program update information for updating the second control program is transmitted from the program update unit, acquiring the program update information for updating the second control program from among communication contents between the program update unit and the first control unit acquired via the second communication line.

2. The vehicle program rewriting system according to claim 1, wherein
   the first control unit executes control of updating the first control program based on acquisition of the program update information for updating the first control program for controlling a motor from the program update unit.

3. The vehicle program rewriting system according to claim 1, further comprising:
   a first communication unit configured to establish communication between the program update unit and the first control unit, wherein
   the second communication line branches from a portion of the first communication line between the first communication unit and the first control unit.

4. The vehicle program rewriting system according to claim 3, further comprising:
   a second communication unit configured to communicate with the second control unit;
   a third communication line that connects the second communication unit and the second control unit; and
   a fourth communication line branching from the third communication line and connected to the first control unit, wherein
   the second communication unit executes control of, based on acquisition of an update completion notification of the second control program from the second control unit based on the program update information, returning the update completion notification of the second control program to the second control unit and transmitting the update completion notification of the second control program via the fourth communication line to the first control unit.

5. The vehicle program rewriting system according to claim 4, wherein
   the first control unit is configured to execute control of transmitting, to the program update unit, the update completion notification of the second control program acquired via the fourth communication line as it is.

6. The vehicle program rewriting system according to claim 1, further comprising:
   a motor configured to be controlled by the first control unit and the second control unit, wherein
   the first control unit executes control of, based on acquisition of the program update information for updating the first control program for controlling the motor from the program update unit via the first communication line, updating the first control program, and
   the second control unit executes control of, based on acquisition of the program update information for updating the second control program for controlling the motor from the program update unit via the second communication line, updating the second control program.

7. The vehicle program rewriting system according to claim 1, wherein
   the program update information includes first control program update information for updating the first control program and second control program update information for updating the second control program, and
   the program update unit transmits the second control program update information when transmitting the first control program update information.

8. The vehicle program rewriting system according to claim 7, wherein
   a vehicle conversion device includes the first control program update information and the second control program update information,
   the program update unit includes transmission destination information of the first control unit for transmitting the program update information to the first control unit, and
   the program update unit transmits both the first control program update information and the second control program update information to the first control unit based on the transmission destination information of the first control unit.

9. The vehicle program rewriting system according to claim 7, wherein
both the first control program update information and the second control program update information are transmitted to the first control unit, and
the program update information includes first identification information for identifying the program update information of the first control unit and second identification information for identifying the program update information of the second control unit.

10. A shift device comprising:
a first control unit configured to execute a first control program for controlling a motor;
a second control unit provided separately from the first control unit and configured to execute a second control program for controlling the motor together with the first control unit;
a first communication line that connects, when rewriting of at least one of the first control program and the second control program is executed, the first control unit and a program update unit which transmits program update information to the first control unit; and
a second communication line branching from the first communication line and connected to the second control unit, wherein
the second control unit executes control of, when the program update information for updating the second control program is transmitted from the program update unit, acquiring the program update information for updating the second control program from among communication contents between the program update unit and the first control unit acquired via the second communication line.

* * * * *